Aug. 10, 1926.  1,595,362
J. V. SCHAEFER
METHOD OF MAKING AND APPLYING MORTAR
Filed Jan. 26, 1923
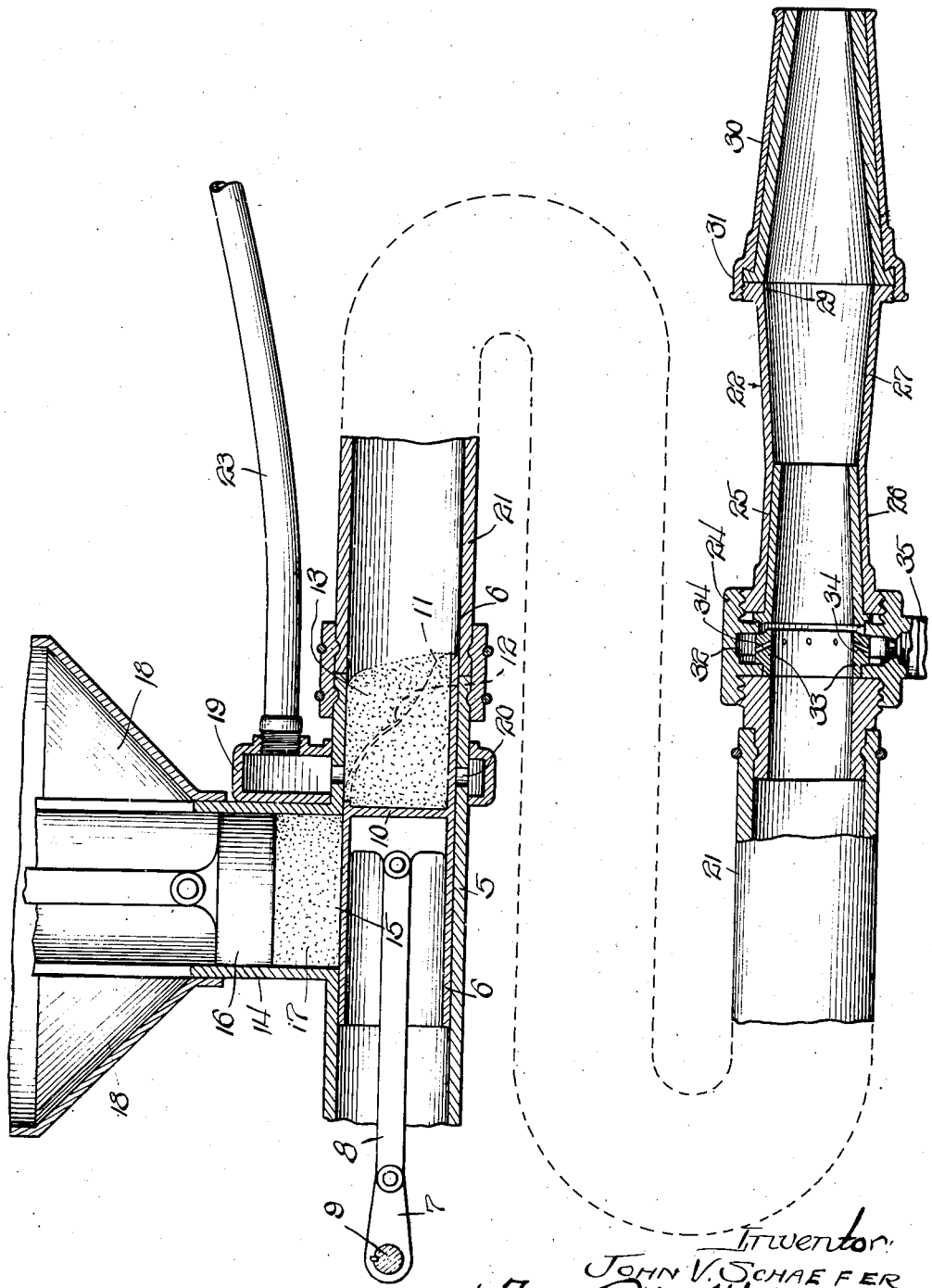
Inventor
JOHN V. SCHAEFER
By Foreé Maur Hinkle
Attys Patented Aug. 10, 1926.

1,595,362

UNITED STATES PATENT OFFICE.

JOHN V. SCHAEFER, OF CHICAGO, ILLINOIS, ASSIGNOR TO CEMENT GUN CONSTRUCTION CO., OF CHICAGO, ILLINOIS, A CORPORATION OF ILLINOIS.

METHOD OF MAKING AND APPLYING MORTAR.

Application filed January 26, 1923. Serial No. 615,183.

This invention relates to methods of making and applying mortar.

Mortar, as the term is herein employed, comprehends a suitably hydrated mixture or conglomerate of adhesive and filling materials. The mortars in common use are hydrated conglomerates of such adhesives as cement, lime, etc., mixed with sand or comminuted cinders, slate, stone and similar materials.

The invention will be explained as applied to the making and applying of a mortar comprising a hydrated mixture of ordinary cement, such for example as Portland cement, and sand. It is to be understood, however, that the terms sand and cement, as hereinafter employed, are intended to include all suitable materials of a kindred nature.

Heretofore mortars have been produced and applied through the use of compressed air and apparatus commonly known as a "cement gun".

It has been the practice, heretofore, to separately convey dry cement and dry sand to a nozzle where the same are brought together and from which they are projected by the compressed air into the atmosphere to the point of application. Water is also projected from the nozzle, simultaneously with the cement and sand. It is understood and intended in the aforesaid prior practice that the cement, sand and water mix, hydrate and combine after projection, either at the point of application or in the atmosphere between the nozzle and the point of application.

The methods or processes heretofore employed possess several disadvantages. It has been the usual experience that quantities of free dry cement are uselessly deposited on and about the work and on the clothes and persons of the workmen. The wind may cause such deposits to collect at considerable distances from the desired point of application. This phenomenon is commonly called "dusting". Quantities of dry sand are also deposited and borne away by the wind, or fall to the ground.

These deposits of free dry sand and cement are objectionable because they produce more or less discomfort and danger to workmen and other persons who may be about the work. They represent a waste of materials. Also the removal of the deposits cause delays and entail expense.

I believe that these deposits and "dusting" result from an insufficient period of time allowed for thorough mixing, combining and hydrating of the various elements constituting the mortar and the difficulty of such actions taking place after projection from the nozzle.

One of the objects of the present invention is to provide an improved method or process for making and applying mortar.

Another object is to provide a process whereby objectional deposits of uncombined ingredients will be prevented.

Another object is to eliminate "dusting".

Another object is to provide a process for more efficiently, satisfactorily, and expeditiously making and applying mortar in the proper condition to produce the desired results.

A further object is the provision of a method for completely forming mortar while in transit in a closed conduit and projecting it therefrom in a completed state.

Other objects and advantages will hereinafter appear.

In carrying my invention into effect I mix the sand and cement by first thoroughly dampening the sand to an extent which will moisten substantially every grain without permitting accumulation of free water. This may be done by steam, vapor, spraying, dampening and then draining or straining the sand, or otherwise. I then thoroughly mix the cement in a dry state, in desired proportion, with the sand, so that each grain of sand is coated and completely enclosed in an envelope of cement and held thereon by adhesion caused by the dampened grains. This forms a non-adhesive mixture as a whole, so that it will not stick to the inner surface of the pipe or hose in transit, and at the same time the small amount of water is not sufficient to cause crystallization of the cement. I then conduct the mixture thru a hose, by application of air under pressure, and I, preferably, admit the mixed materials into the hose or conduit in separated charges, each charge forming a self-constituted plug or piston. By this means the aggregated materials may be moved thru the conduit with a smaller volume of air. At a given point in the conduit water, under pressure, is introduced and further mixing and complete hydration is effected while the conglomerate and water, or mortar thus formed, is still confined and moving within the conduit. After the ingredients have thus been mixed and combined, constituting mortar, the mortar as such is projected from the end of the conduit or nozzle to the point of application, where it is permitted to set and harden.

When the water admitted into the conduit is brought into contact with the dampened sand and the encompassing cement, the operation of hydration is accelerated or quickened because of the fact that the constituent materials are already damp and are in a more receptive condition, and for another reason that further mixing of the ingredients takes place within the conduit after the introduction of the water to subject every particle of cement to the action of the water, so that the material projected from the nozzle is mortar instead of uncombined materials brought together and mixed in the air after leaving the conduit or nozzle.

The completely formed mortar as such is made by my mode of procedure, passes only thru a part of the conduit near the end of its confinement, or thru the nozzle, which may subsequently be removed from the remainder of the conduit and cleaned of any portion of the mortar that may, perchance, adhere to the inner surface thereof to prevent it from hardening.

I have shown, in the drawings, a very simple machine, or necessary parts thereof, for introducing the charges of cement and sand into the conduit and, in connection therewith, I have shown my improved mixing nozzle within which the charges or plugs of sand and cement may be broken up and within which they are further mixed, hydrated and combined into mortar before being projected.

Whether the sand and cement are introduced into the nozzle in a constant stream or, preferably, in intermittent accumulations in form of plugs, has no modifying effect upon the gist of the invention, the method of procedure is substantially the same.

In the drawings:—

The cylinder 5 contains a charge receiving cylinder 6 which is reciprocated in cylinder 5 by a crank 7 and connecting rod 8. The crank is secured to a drive shaft 9 which may be rotated by any suitable means. The cylinder 6 is divided by a partition 10, the front end and side 11 and 12 being open to receive a charge 13 from the communicating cylinder 14 when the cylinder 6 is retracted by the crank until its front end 12—13 registers with the opening 15 under cylinder 14. A piston 16 is moved in timed relation with cylinder 6 to push a charge 17 from the hopper 18 into the charge holding front end of cylinder 6.

An annular casing 19 surrounds the front end of cylinder 5 and communicates therewith thru openings 20 to blow the charges 11 into a connected hose or conduit 21 to the mixing nozzle 22, which is detachably secured to the remote end of the hose 21. The nozzle herein disclosed is more specifically claimed in my copending application Serial No. 618,210.

A pipe 23, containing air under pressure, is connected to the annular casing 19 and to a proper source of air supply—not shown— to blow the mixed sand and cement thru the conduit to the nozzle 22.

The nozzle 22 may quickly be screwed to the fitting 24 which is secured to the end of the hose or conduit 21. The first section 25 of the nozzle is biconical the two cones 26 and 27 meeting at 28, where the area is materially contracted. The cone part 27 gradually increases in area to its end 29, where it is detachably connected with the cone-shape section 30 by a screw connection 31. The outer end of the cone 30 is, preferably, the smallest part of the conduit and nozzle.

In the fitting 24 and within an annular opening 32 is a ring 33 having spaced radial, forwardly inclined openings 34 to admit water under pressure into the conduit 21 thru the hose 35 which may be connected to a suitable source of water supply.

Sections 26 and 30 are shown to be lined with relatively soft substances to prevent abrading the inner surfaces of the nozzle.

I have found, from practice, that it is only necessary to line those portions of the nozzle within which the stream is being contracted and its speed accelerated. The part 27 within which the stream is expanding, and therefore retarded, or moving at a slower speed, seems not to require the lining.

In this form of nozzle, the oblique walls, as shown, vary the speed of the stream and contribute with the water, in the manner in which the latter is introduced into the nozzle to change the course of movement of the mortar constituents, from a strictly axial course into paths somewhat oblique thereto. The particles strike the converging walls of the nozzle and are thereby caused to rebound, to a degree, into other paths somewhat angularly related to the initial course.

The water is not affected in precisely the same manner, therefore the cement-bound grains of sand are separated from each other and brought together again while in the nozzle after every portion of the conglomerate has been exposed to the hydrating effect of the water. Thus each grain of the sand is separately hydrated and the cement surrounding it is placed in condition preparatory to forming its complex chemical compounds, referred to as crystallization, by the formation of silicates and aluminates of lime and the like in the process of hardening providing matrices for as many grains of sand and forming a bound-together hardened mass after "set" or hardening.

Having described my invention what I claim as new and desire to secure by Letters Patent, is:—

1. The method of making and applying mortar, which comprises mixing dry cement with pre-dampened sand, the amount of moisture in the mixture being insufficient to complete hydration, conducting the dampened mixture toward a point of projection, further mixing and breaking up the dampened mixture and at the same time introducing a stream of water completely to hydrate the mixture while in movement toward the point of projection, and finally projecting the mortar thus formed to a point of application.

2. The method of making and applying mortar, which comprises mixing dry cement with pre-dampened sand, the amount of moisture in the mixture being insufficient to complete hydration, confining the mixture and conducting it toward a point of projection, introducing a stream of water near said point of projection completely to hydrate the mixture, further mixing the hydrated materials while still confined by causing them to diverge from their normal paths, and finally projecting the mortar thus formed upon a receiving surface.

3. The method of making and applying mortar, which comprises mixing dry cement with pre-dampened sand, the amount of moisture in the mixture being insufficient to complete hydration, confining the mixture and conducting it toward a point of projection, introducing a stream of water near said point of projection completely to hydrate the mixture, further mixing the hydrated materials together while still confined by causing them to diverge from their normal paths and coincidentally by alternately accelerating and retarding their movement, and finally projecting the mortar thus formed upon a receiving surface.

In testimony whereof I hereunto subscribed my name.

JOHN V. SCHAEFER.